(12) United States Patent
Tenorio

(10) Patent No.: US 10,282,765 B2
(45) Date of Patent: *May 7, 2019

(54) ORDER ACCELERATION THROUGH USER DOCUMENT STORAGE AND REUSE

(75) Inventor: Manoel Tenorio, Mountain View, CA (US)

(73) Assignee: JDA Software Group, Inc., Scottsdale, AZ (US)

( * ) Notice: Subject to any disclaimer, the term of this patent is extended or adjusted under 35 U.S.C. 154(b) by 2462 days.

This patent is subject to a terminal disclaimer.

(21) Appl. No.: 10/002,433

(22) Filed: Oct. 23, 2001

(65) Prior Publication Data
US 2004/0158496 A1 Aug. 12, 2004

Related U.S. Application Data

(60) Provisional application No. 60/326,071, filed on Sep. 27, 2001.

(51) Int. Cl.
*G06Q 30/08* (2012.01)
*G06Q 30/06* (2012.01)

(52) U.S. Cl.
CPC ............. *G06Q 30/06* (2013.01); *G06Q 30/08* (2013.01)

(58) Field of Classification Search
USPC ..................... 705/26, 26.1, 22, 28
See application file for complete search history.

(56) References Cited

U.S. PATENT DOCUMENTS

| | | | |
|---|---|---|---|
| 5,132,900 A | 7/1992 | Gilchrist et al. | 364/419 |
| 5,379,340 A | 1/1995 | Overend et al. | 379/93 |
| 5,675,791 A | 10/1997 | Bhide et al. | 395/621 |
| 5,812,995 A | 9/1998 | Sasaki et al. | 707/1 |
| 5,920,873 A | 7/1999 | Van Huben et al. | 707/202 |
| 5,987,506 A | 11/1999 | Carter et al. | 709/213 |
| 6,014,644 A * | 1/2000 | Erickson | 705/37 |

(Continued)

FOREIGN PATENT DOCUMENTS

| | | | | |
|---|---|---|---|---|
| EP | 1 056 024 A1 | 11/2000 | | G06F 17/30 |
| JP | 04352068 A | 12/1992 | | G06F 15/20 |
| WO | WO01/61433 A2 | 8/2001 | | |

OTHER PUBLICATIONS

Definition of "file system", The Computer Desktop Encyclopedia, 1996.*

(Continued)

*Primary Examiner* — Luna Champagne
(74) *Attorney, Agent, or Firm* — Spencer Fane LLP; Steven J. Laureanti

(57) ABSTRACT

An electronic commerce system for order acceleration through user document reuse includes one or more document repositories that stores a plurality of user documents. The system also includes a global content directory that includes a plurality of product and document classes organized in a hierarchy where each class categorizes a number of documents and is associated with one or more attributes of the documents categorized in the class. The system further includes a search interface to search the user documents. A security module encrypts the user documents and decrypts the user documents when a buyer has the required permission level. An intelligence module updates one or more sections of the user documents with current information so that a buyer can reuse the user document to accelerate an order.

31 Claims, 6 Drawing Sheets

(56) References Cited

U.S. PATENT DOCUMENTS

| | | | |
|---|---|---|---|
| 6,035,297 A | 3/2000 | Van Huben et al. | 707/8 |
| 6,076,080 A * | 6/2000 | Morscheck et al. | 705/400 |
| 6,088,693 A | 7/2000 | Van Huben et al. | 707/8 |
| 6,088,717 A | 7/2000 | Reed et al. | 709/201 |
| 6,092,121 A | 7/2000 | Bennett et al. | 709/250 |
| 6,094,654 A | 7/2000 | Van Huben et al. | 707/8 |
| 6,226,675 B1 | 5/2001 | Meltzer et al. | 709/223 |
| 6,253,188 B1 | 6/2001 | Witek et al. | 705/14 |
| 6,269,361 B1 | 7/2001 | Davis et al. | 707/3 |
| 6,275,933 B1 | 8/2001 | Fine et al. | 713/2 |
| 6,389,427 B1 * | 5/2002 | Faulkner | 707/741 |
| 6,397,231 B1 | 5/2002 | Salisbury et al. | 707/515 |
| 6,442,574 B1 | 8/2002 | Schumacher et al. | 707/501 |
| 6,473,791 B1 | 10/2002 | Al-Chosein et al. | 709/217 |
| 6,484,143 B1 | 11/2002 | Swildens et al. | 705/1 |
| 6,560,620 B1 | 5/2003 | Ching | 707/511 |
| 6,778,991 B2 | 8/2004 | Tenorio | 707/10 |
| 6,901,403 B1 * | 5/2005 | Bata et al. | |
| 7,107,268 B1 * | 9/2006 | Zawadzki | G06Q 10/06 |
| 2001/0016828 A1 * | 8/2001 | Philippe | G06F 17/22 |
| | | | 705/26.8 |
| 2001/0020240 A1 | 9/2001 | Classen | 707/104 |
| 2001/0049675 A1 | 12/2001 | Mandler et al. | 707/1 |
| 2002/0007335 A1 * | 1/2002 | Millard | G06Q 20/10 |
| | | | 705/37 |
| 2002/0013827 A1 * | 1/2002 | Edstrom et al. | 709/219 |
| 2002/0095301 A1 | 7/2002 | Villena | 705/1 |
| 2002/0107755 A1 * | 8/2002 | Steed et al. | 705/26 |
| 2002/0147656 A1 * | 10/2002 | Tam et al. | 705/26 |
| 2003/0050958 A1 | 3/2003 | Keller et al. | 709/201 |

OTHER PUBLICATIONS

Carey, et al. "Load Balancing in a Locally Distributed Database System," © 1986 *ACM* 0-89791-191-1/86/0500/0108 (pp. 108-119).

"Oracle® e-Commerce Gateway" User's Guide, Release 11i.2, Aug. 2000, Part No. A75089-02.

* cited by examiner

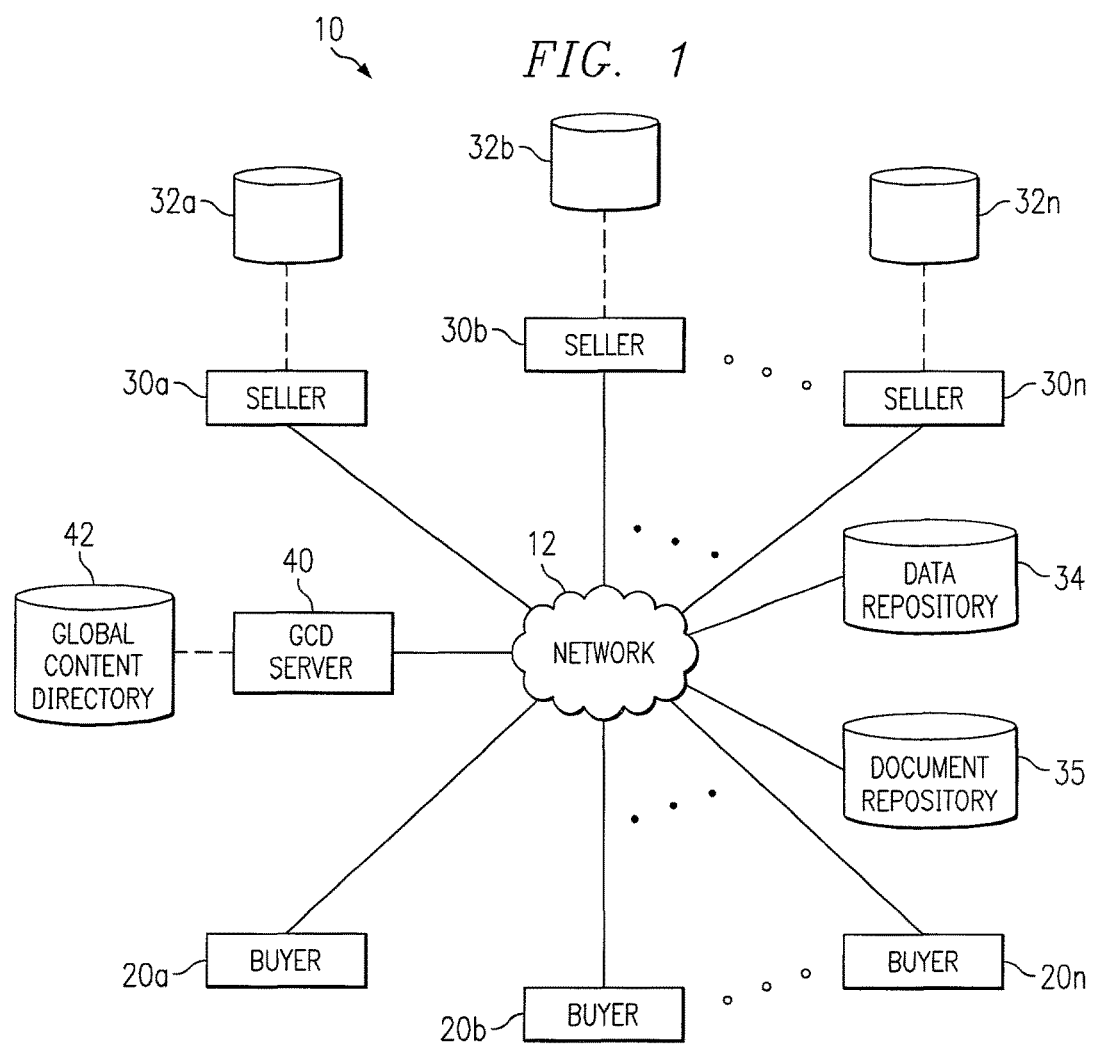

TO FIG. 2B

| | 152a | 152b | 152c | 152d | 152e | | 152n |
|---|---|---|---|---|---|---|---|
| | PID | PRODUCT TYPE | MANUFACTURER | INK COLOR | TIP SIZE | ... | PRICE |
| | 23 | BALL POINT | ABC | BLUE | MEDIUM | ... | 0.12 |
| | 29 | BALL POINT | ABC | BLACK | MEDIUM | ... | 0.12 |
| | 56 | BALL POINT | XYZ | BLACK | MEDIUM | ... | 0.13 |
| | 98 | BALL POINT | XYZ | GREEN | MEDIUM | ... | 0.13 |
| | ... | ... | ... | ... | ... | ... | ... |
| | 12 | FELT TIP | XYZ | BLACK | BROAD | ... | 0.17 |
| | 16 | FELT TIP | ABC | BLACK | BROAD | ... | 0.18 |
| | 56 | FELT TIP | ABC | RED | FINE | ... | 0.16 |
| | 123 | FELT TIP | XYZ | RED | FINE | ... | 0.16 |
| | ... | ... | ... | ... | ... | ... | ... |
| | 2 | ROLLER BALL | XYZ | BLUE | FINE | ... | 0.25 |
| | 59 | ROLLER BALL | XYZ | BLACK | FINE | ... | 0.25 |
| | 143 | ROLLER BALL | XYZ | BLACK | MEDIUM | ... | 0.22 |
| | 456 | ROLLER BALL | ABC | RED | EXTRA FINE | ... | 0.29 |
| | ... | ... | ... | ... | ... | ... | ... |

FIG. 4

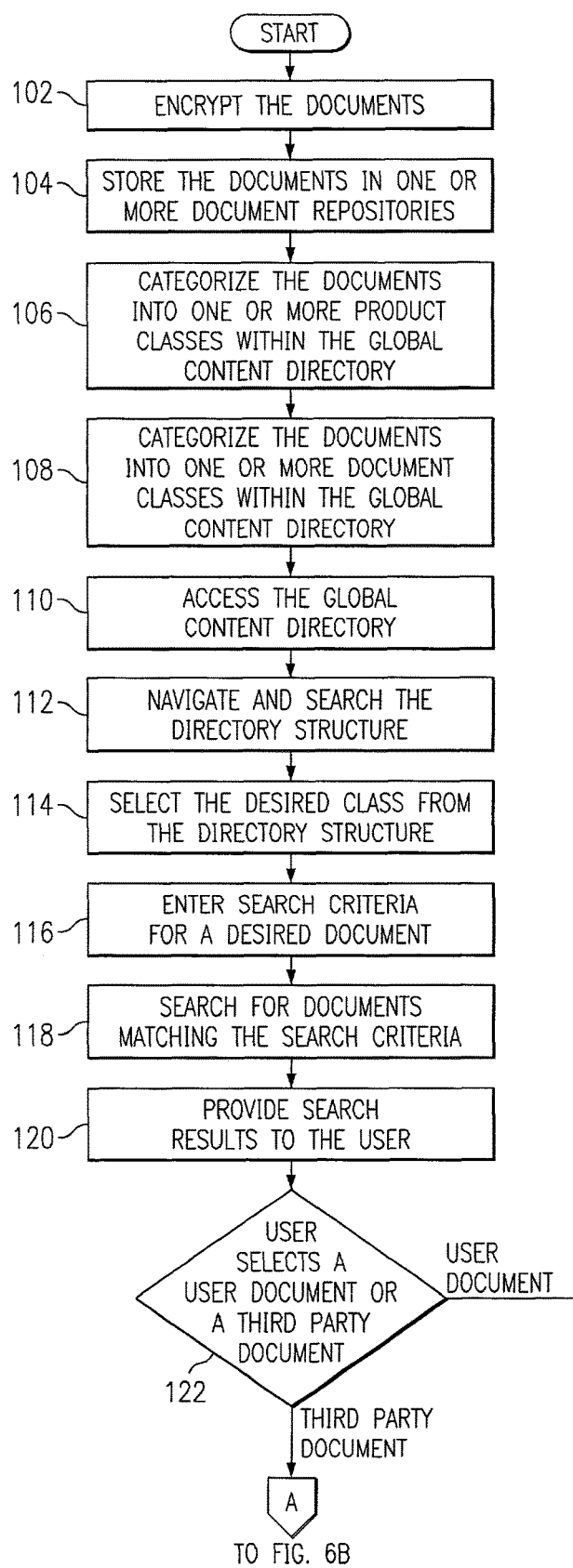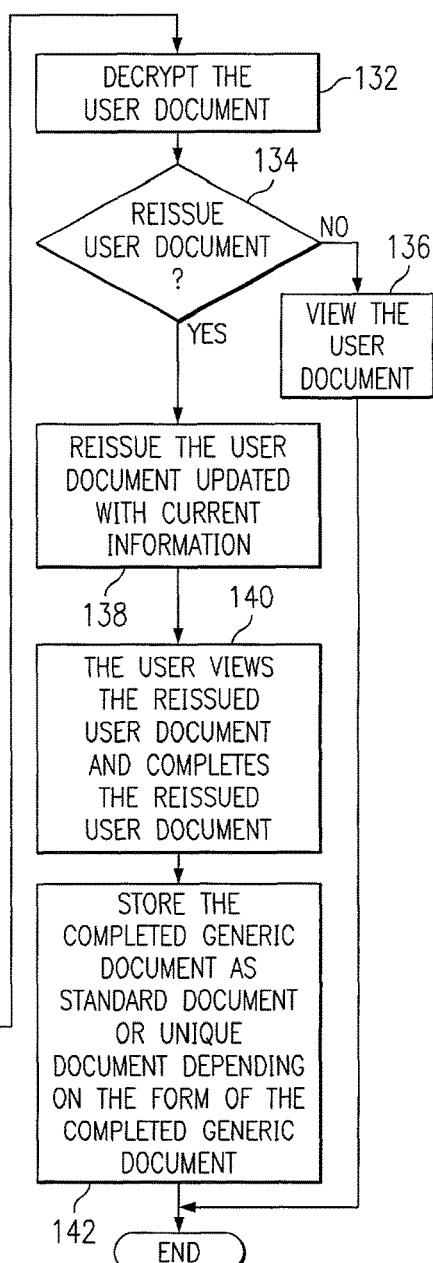
FIG. 6A

ORDER ACCELERATION THROUGH USER DOCUMENT STORAGE AND REUSE

RELATED APPLICATIONS

This patent application claims priority to U.S. provisional patent application No. 60/326,071 filed Sep. 27, 2001, and entitled "ORDER ACCELERATION THROUGH USER DOCUMENT STORAGE AND REUSE."

CROSS REFERENCE TO CO-PENDING APPLICATIONS

This application is co-pending with patent application Ser. No. 10/001,506, filed Oct. 23, 2001, and entitled "THIRD PARTY DOCUMENT STORAGE AND REUSE", now U.S. Pat. No. 7,149,744, and patent application Ser. No. 09/999,524, filed Oct. 23, 2001, and entitled "DOCUMENT STORAGE AND CLASSIFICATION", now U.S. Pat. No. 7,054,841.

TECHNICAL FIELD OF THE INVENTION

This invention relates to electronic commerce and more particularly to order acceleration through user document storage and reuse.

BACKGROUND OF THE INVENTION

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. In addition, the buyer will also need to execute one or more documents with the seller, such as a request for a quote or a purchase order form, to complete the e-commerce transaction. If the buyer does not have a preferred seller or if the buyer is purchasing the product for the first time, the buyer will often perform a search for a number of sellers that offer the product, then access numerous seller web sites to determine which seller offers certain desired product features at the best price and under the best terms for the buyer, select a seller, and execute numerous blank documents to complete the e-commerce transaction. The matching phase of e-commerce transactions (matching the buyer with a particular seller) and the document execution are often inefficient processes. The matching phase is inefficient because of the large amount of searching involved in finding a product and because once a particular product is found, the various offerings of that product by different sellers may not be easily compared. The document execution phase is often inefficient because the buyer generally starts out with a blank document or no document with most e-commerce transactions and therefore has to create a document or re-enter all the information into the blank document even though some of the information in the documents changes very little or not at all between different sellers and different products.

SUMMARY OF THE INVENTION

According to the present invention, disadvantages and problems associated with previous e-commerce techniques have been substantially reduced or eliminated.

In one embodiment of the present invention, an electronic commerce system includes one or more document repositories that store a plurality of user documents. The system also includes a global content directory that includes a plurality of classes organized in a hierarchy. The classes include both product classes and document classes. Each class categorizes a number of user documents and is associated with one or more attributes of the user documents categorized in the class. At least one of the classes has one or more associated pointers that identify one or more of the document repositories. The system also includes a security module that decrypts the user documents to allow a buyer to view the user documents. The system further includes an intelligence module that updates one or more sections in the user documents with current information. The system also includes a search interface that communicates a search query to the document repositories for the user documents and enables a buyer to search the user documents.

Particular embodiments of the present invention may provide one or more technical advantages. For example, certain embodiments of the present invention allow a buyer to view and reuse documents the buyer has previously used in previous e-commerce transactions. Document reuse accelerates orders when the buyer deals with either a seller that the buyer has had previous interaction with or a new seller. When it is a seller the buyer has dealt with before, the buyer accesses a document from a previous transaction between the buyer and that seller and updates less than all the sections, such as quantity and price, the document is complete, and the buyer sends the document to the seller to complete the transaction. If a buyer deals with a new seller but the transaction is for products the buyer has previously purchased, the buyer accesses a previous user document with that product and updates the document with the new seller information and the document is complete. In either case, the buyer saves time because the buyer does not have to recreate the documents but only has to update certain sections in the documents. Therefore, e-commerce transactions will occur more quickly and efficiently as the buyer reuses more user documents and less of the buyer's time is consumed by creating and tracking documents.

Furthermore, particular embodiments of the present invention for user document storage and reuse establish both as a practice and a system forms of acceptable behaviors between buyers and sellers. Because the user reuses documents with new and old sellers, the documents become standardized over time and the buyers and sellers realize a better understanding of what the other buyers and seller require in the documents. Buyers and sellers will know what terms and conditions need to be in certain documents and knowing this in advance will eliminate some of the negotiation of transaction terms between the buyer and seller. In addition, a buyer can review all of their documents and study purchase histories and any trends that may have developed between the buyer and a particular seller or product. Other technical advantages may be readily apparent to those skilled in the art from the following figures, description, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example electronic commerce system;

FIG. 4 illustrates an example table of a seller database;

FIGS. 6A & 6B illustrate an example method for storing, classifying, and reusing documents.

DETAILED DESCRIPTION OF EXAMPLE EMBODIMENTS

Figure 2A:
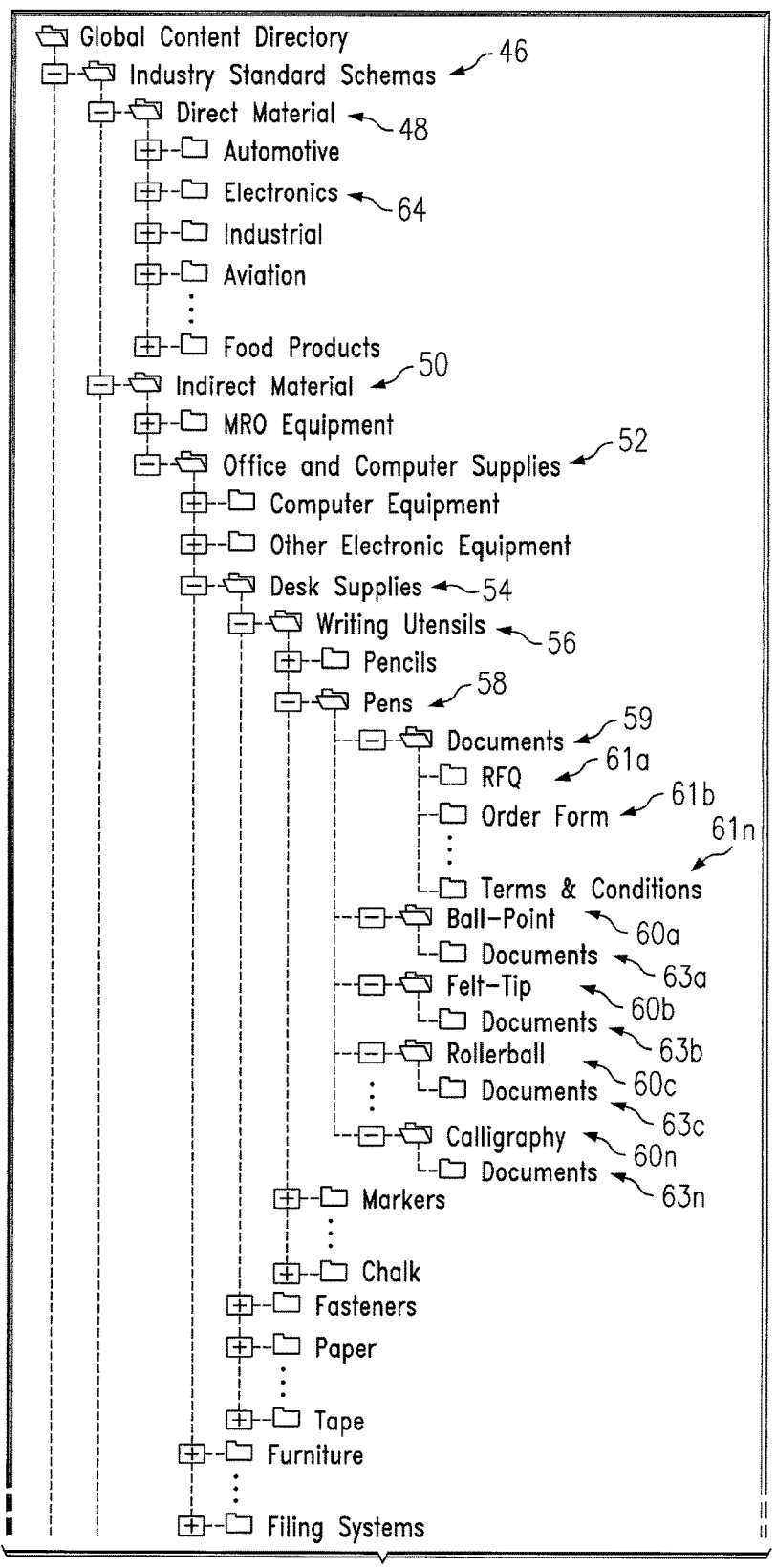
FIGS. 2A & 2B illustrate an example directory structure of an example global content directory for product classes.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that GCD 42 provide directory services to buyers 20 and sellers 30 around the world (or in any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of GCD 42, a buyer 20 may have to access numerous seller web sites to determine which seller 30 offers certain desired features of the product at the best price. Sellers 30 may each provide one or more databases 32, such as relational databases, that include data identifying the products available from sellers 30 and their features. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

As previously stated, the transaction phase involves the creation and use of one or more documents between buyer 20 and seller 30. To create and use documents without the help of GCD 42 in the transaction phase, buyer 20 may have to create new documents each time buyer 20 enters into a new transaction with a seller 30 and then negotiate the legal and business points with seller 30 even though buyer 20 and seller 30 may have had previous interaction because there is no stored record of previous transactions unless buyer 20 or seller 30 keeps such a record. The document creation and negotiation increases transaction costs and the time of each transaction. In addition, if buyer 20 desires a record of what buyer 20 has previously purchased in prior transactions with multiple sellers 30, buyer 20 is responsible for storing buyer's 20 own documents in a buyer database or in some other location accessible to buyer 20. And the problem magnifies when buyer 20 interacts with a seller 30 with whom buyer 20 has never interacted because there is no common ground to begin from and documents will generally need to be created. Even when buyer 20 has been involved in numerous transactions with a particular seller 30, document generation may be inefficient. Also, when a buyer 20 new to system 10 decides to use system 10 for the first time, finalizing a transaction with seller 30 is a lengthy and tedious process because buyer 20 has to create all the required documents from scratch or be forced to use the documents of seller 30. Some sellers 30 attempt to keep a record of transactions by storing documents in one or more seller databases 32. But the documents stored in seller databases 32 are typically only available to sellers 30 to whom the documents belong and generally are not available to buyers 20 and other sellers 30.

A solution to the above problems, at least in part, is GCD 42. GCD 42 is a universal directory of the contents of multiple seller databases 32 (and potentially all seller databases 32) and allows a way for the documents to become accessible to buyers 20 and other sellers 30. GCD 42 may be implemented using one or more servers 40 or other computers located at one or more locations. Most or all of the content in these seller databases 32 remains stored in databases 32, but this content is accessible using GCD 42. Therefore, like the global database described above, GCD 42 provides buyers 20 with access to product data relating to a multitude of products (and potentially seller data relating to one or more sellers 30 of the products) as well as the documents used in previous transactions between buyers 20 and sellers 30. But unlike the global database, GCD 42 does not attempt to store all of this data and all the documents in one enormous database. Where appropriate, reference to "data" is meant to include product data (meaning information reflecting values for certain attributes of a product), seller data (meaning information reflecting values for certain seller attributes), or both product data and seller data. When appropriate, reference to "documents" is meant to include documents created or used by a buyer 20 for a transaction and/or documents created or used by a seller 30 for a transaction.

GCD 42 provides a directory of products and documents using a directory structure in which products and/or documents are organized using a hierarchical classification system. A buyer 20 may navigate or search the directory to find a particular product class into which products are categorized, a particular product class into which documents are categorized, or a particular document class into which documents are categorized. The product data (and potentially seller data) associated with a product included in a product class may actually be stored in and obtained by GCD 42 from a seller database 32. The documents associated with a product included in a product class and the documents included in a document class may also be stored in and obtained by GCD 42 from a seller database 32. However, the requested data or document may be transparently provided to buyer 20 such that all of the product data and documents may appear to buyer 20 as being included in GCD 42. Although the product data, seller data, and documents have primarily been described as being stored in seller databases 32, the present invention contemplates product and seller data and documents being stored in any suitable manner and being retrieved from any suitable sources. For example, system 10 may include a shared data repository 34 that contains product data and/or seller data that may be combined with data from one or more seller databases 32 and that contains documents that may compliment documents from one or more seller databases 32, as described in further detail below.

Figure 2B:
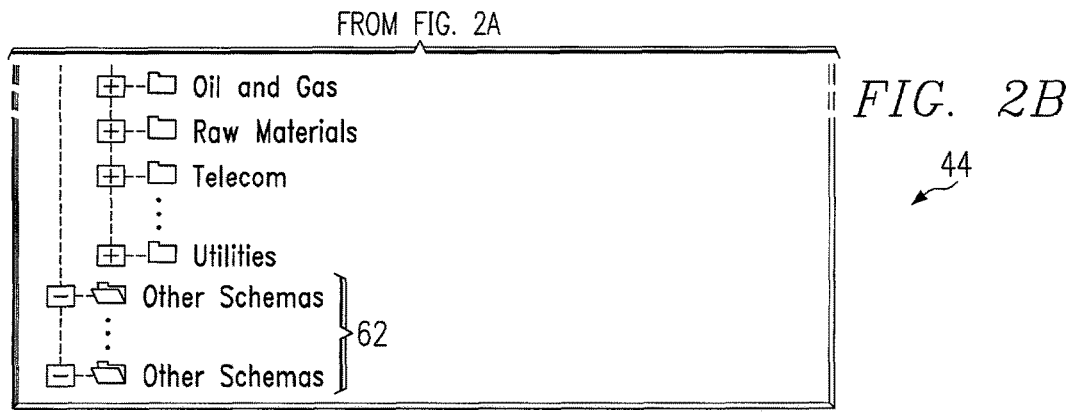

FIG. 2 illustrates an example directory structure 44 of an example GCD 42 for product classes. Products and documents categorized in GCD 42 may be organized according to schemas. A schema may include a set of product classes (which may be referred to as a "taxonomy") organized in a hierarchy. Each class may be associated with a set of product features, characteristics, or other product attributes (which may be referred to as a "product ontology") and/or with a set of document features, characteristics, or other document attributes (a "document ontology") for each product type. For example, pens may have different kinds of tips (such as ball point or felt tip), different tip sizes (such as fine, medium, or broad), and different ink colors (such as blue, black, or red). In addition, felt pens may have certain documents associated with them while ball point pens may have different documents associated with them. Accordingly, a schema may include a class corresponding to pens that have a product ontology including tip type, tip size, and color, or other appropriate attributes as well as documents for pens and specific pen types. Within a class, products may be defined by product attribute values (such as, for example, ball point, medium tip, blue ink). Reference to "value" is meant to include any appropriate data reflecting an instance of a product attribute or a seller attribute. Product attribute values and seller attribute values may include numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product and document ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products and documents may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60a-60n ("n" indicating that any number of classes 60 may be included in pens class 58), a pen documents class 59 for all pens, and a pen type documents class 63a-63n for each pen type class 60a-60n, respectively. Each of classes 50, 52, 54, 56, 58, and 60 is located at a different level of directory structure 44. A class at any level in directory structure 44 may include one or more sub-classes, those sub-classes may include one or more sub-classes, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, 60*b*, and 63*b* form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

A buyer 20 may navigate through directory structure 44 by expanding or collapsing various classes as desired. For example, FIG. 2 illustrates an expansion of certain classes of directory structure 44 to reach a felt-tip pen class 60*b*. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pens having medium tips. Alternatively, if buyer 20 navigates to the end of a branch of directory structure 44, such as felt-tip pen class 60*b*, GCD 42 may then enable buyer 20 to search for such pens that have blue ink and medium tips (which may reach the same result as the search above).

Buyer 20 may also search for sellers matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers matching certain seller attribute values in any appropriate manner. In one embodiment, for example, buyer 20 provides search criteria including both values for product attributes and for seller attributes (search criteria may instead be generated automatically, in whole or in part, as described below), and server 40 searches for products that match the product attribute criteria and are offered by sellers matching the seller attribute criteria. In another embodiment, buyer 20 provides only product attribute values as search criteria, and server 40 limits its search for products matching the product attribute criteria to databases 32 associated with sellers 30 known to match seller attribute criteria that buyer 20 may want according to a buyer profile or otherwise.

Buyer 20 may also search for documents relating to desired products within the product classes using directory structure 44 and GCD 42. Buyer 20 may search directory structure 44 using GCD 42 to locate documents related to particular products. For example, buyer 20 may desire to buy pens and require documents to facilitate the transaction. Buyer 20 may go about finding pen related documents in at least two ways, depending on the specificity of the product sought by buyer 20. If buyer 20 is interested in more than one pen type, buyer 20 can navigate through directory structure 44 to pen documents class 59. Once in pen documents class 59, buyer 20 can perform a search for all documents related to all types of pens. Pens document class 59 includes one or more document sub-classes 61*a*-61*n* categorizing the pen documents by document type so that if buyer 20 knows which type of document buyer 20 needs, buyer 20 can search for documents of that particular type related to all types of pens. For instance, document sub-class 61*a* contains request for quote ("RFQ") documents for all pen types while document sub-class 61*b* contains order form documents for all pen types. So if buyer 20 wants to request a quote for an order of pens, buyer 20 may navigate to document sub-class 61*a* and search the RFQ documents relating to all pen types. Categorizing the documents within the product classes also allows for buyer 20 to perform more detailed searching. For instance, if buyer 20 is only interested in ball point pens, buyer 20 may navigate to ball point class 60*a*, as described above. Ball point pen class 60*a* includes ball point pen document class 63*a* that contains documents pertaining to ball point pens. Buyer 20 may initiate a search within pen type document class 63*a* and search all the documents related to ball point pens regardless of document type. A search within ball point pen document class 63*a* can also be narrowed by limiting the search criteria for only a specific document type, for instance a search for purchase orders, so that the search result only returns purchase order documents relating to ball point pens. Once buyer 20 has located an appropriate document as to both document type and product type, buyer 20 can modify the document for buyer's 20 own use as described below.

As described above, in one embodiment product data (at least product data more detailed than data provided by a taxonomy), seller data, and documents are not stored in GCD 42, but are stored in seller databases 32. For example, a seller 30 may maintain a relational database 32 that includes a plurality of tables containing product attribute values for a variety of products and seller attribute values for each product, a set of products, or all of the products offered by seller 30. Within seller database 32, seller 30 may also store documents from previous transactions between seller 30 and various buyers 20. Product data and seller data may be integrated into one or more tables or may be segregated into different tables. Moreover, product data and seller data for a seller 30 may be stored in the same or separate databases. One or more pointers may be associated with each class to identify the location of one or more databases 32 that include product data, seller data, and documents for products contained in that class or to identify particular data or particular documents in seller databases 32. Therefore, GCD 42 may execute a search for products or documents in databases 32 identified by a pointer corresponding to a user-selected (or automatically selected) class. GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above.

However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a class listed at the end of a branch of the tree structure includes all of the attributes of its parent classes in the branch. Furthermore, each product or document included in a database 32 may be an object that includes all the attributes of the classes in which the product or document is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60b, a search performed by buyer 20 (or by GCD 42 on behalf of buyer 20) from felt-tip pens class 60b may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

When GCD 42 has performed a search of the databases 32 identified by a pointer or pointers associated with a class that buyer 20 has selected (or that has been automatically selected), GCD 42 may return product data, seller data, and/or documents associated with one or more products matching the search criteria. GCD 42 may integrate the product data, seller data, and/or documents resulting from the search into directory structure 44 so that the data appears to buyer 20 as being part of GCD 42. GCD 42 may alternatively present the results of the search in any other appropriate manner. Each product or document resulting from the search may be an object which is a unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller 30 matching certain seller attribute values using GCD 42 and thus eliminate or reduce the need for buyer 20 to individually search numerous seller databases 32 to find the desired product available from a suitable seller. In addition, a buyer 20 may also search for a document matching certain attributes and eliminate the need to recreate documents every time buyer 20 enters into a new transaction with a seller 30 relating to one or more products. GCD 42 provides access to product, seller data, and documents relating to these numerous products using directory structure 44, which organizes products using a hierarchical, object-oriented classification system. Buyer 20 may navigate or search directory structure 44 to find a particular classification of products and various information associated with the products within this classification including documents associated with various products, initiate a search of databases 32 for products and/or documents including product and/or seller data relating to a product, and then communicate with an appropriate database 32 through GCD server 40 or otherwise. Such access to vast numbers of products and documents is provided without the requirement that all data about the products, sellers, and documents be stored in a global database. Instead, this data may be stored in seller databases 32 that can be readily accessed using GCD 42.

One problem that may be associated with the use of the various seller databases 32 is that these databases 32 may include product data about the same class of product (for example, felt-tip pens), but may identify products of that class using different attribute values, may use different names for the same product attribute value, and/or may quantify or distinguish product attribute values differently (using different units of measurement, for example). The same may be true for seller data that may be contained in databases 32. In addition, buyers 20 and sellers 30 have documents in various formats that differ from one another. Some of these issues may be solved using translation mechanisms that convert the data into a uniform format used by GCD 42 as well as convert the varied documents into a standard format understood by GCD 42. Alternatively, sellers 30 may create new databases 32 or manually modify existing databases 32 (or may hire a third party to create or modify databases 32) to conform to a uniform standard in anticipation of a database 32 being used in association with GCD 42 as well as buyers 20 and sellers 30 creating or modifying documents to conform to a standard format to be used in association with GCD 42.

Creating or modifying documents into a standard format is a more difficult task than standardizing the product data because while each document may contain similar basic information, each buyer 20 and seller 30 generally has or requires certain clauses, sections, and provisions not present with or required by other buyers 20 and sellers 30. In addition, certain document types may contain very similar information that does not vary greatly while other document types may vary greatly from each other and have little or no common provisions. For example, a RFQ generally contains sections for contact information for buyer 20 and seller 30, a product description, and the quantity requested and typically most RFQ's will be similar even when created by different buyers 20 or sellers 30. Other documents such as an order cancellation form can vary drastically depending on the conditions required by a particular buyer 20 or seller 30 because each buyer 20 and seller 30 typically has their own procedure and requirements for canceling orders. Therefore, one solution to the standardization problem is to categorize the documents into standard documents and unique documents and provide a shared document repository 35 storing standard documents which enables GCD 42 to function more efficiently.

Standard documents are documents that are in the standardized from recognized by GCD server 40 or documents that do not vary greatly between different buyers 20 and sellers 30 and would be easy to standardize over a given time period. The standardized form for each standard document varies depending on the document type. For instance, the standardized form for a RFQ standard document is different from the standardized form for a purchase order standard document. Unique documents are documents that are not in the standardized form but generally in a format determined by buyer 20 or seller 30 and are generally more difficult to reduce to a standard form. Unique documents often contain terms and provisions specific to a particular buyer 20 or seller 30 which may not apply to all buyers 20 and sellers 30. Unique documents may vary greatly from each other.

Shared document repository 35 includes one or more standard documents. When a buyer 20 or seller 30 creates a standard document or modifies a standard document already in shared document repository 35, the newly created or modified standard document is stored in shared document repository 35. Unique documents may be stored in one or more seller databases 32. Optimally, the combination of the standard and unique documents relating to a particular product will be linked from the product classes of GCD 42 in which the product is classified. For example, pen documents class 59 in GCD 42 may include pointers to both standard documents and unique documents in shared document repository 35 and one or more seller databases 32. Furthermore, one or more pointers to shared document repository 35 may be linked to one or more pointers to seller database 32 such that the related standard documents and unique documents may be associated together. Alternatively, the standard documents in shared document repository 35 may be linked with one or more unique documents in one or more seller databases 32. Unique documents from seller database 32 may be combined with standard documents from shared document repository 35 so that the standard and unique documents may be provided to a buyer 20 as a result of a search, as is described in further detail below with reference to FIGS. 6A & 6B.

Although shared document repository 35 is illustrated as a single storage location, shared document repository 35 may include multiple storage locations at the same or different physical locations. Any appropriate number of storage locations located in a number of physical locations may be used (for example, the storage locations may be distributed in various geographic regions). GCD server 40 may search each of these distributed shared document repositories 35 as appropriate to obtain standard documents that are responsive to a buyer's search. Alternatively, pointers associated with a product class may direct GCD server 40 to one or more particular storage locations. In addition, if multiple shared document repositories 35 are used, each shared document repository 35 may include identical standard documents, some common and some different standard documents, or entirely different standard documents. Furthermore, shared document repository 35 may store the standard documents using any appropriate storage medium. Moreover, it should be noted that although shared document repository 35 is described as including standard documents, seller databases 32 may also include standard documents.

Figure 3:
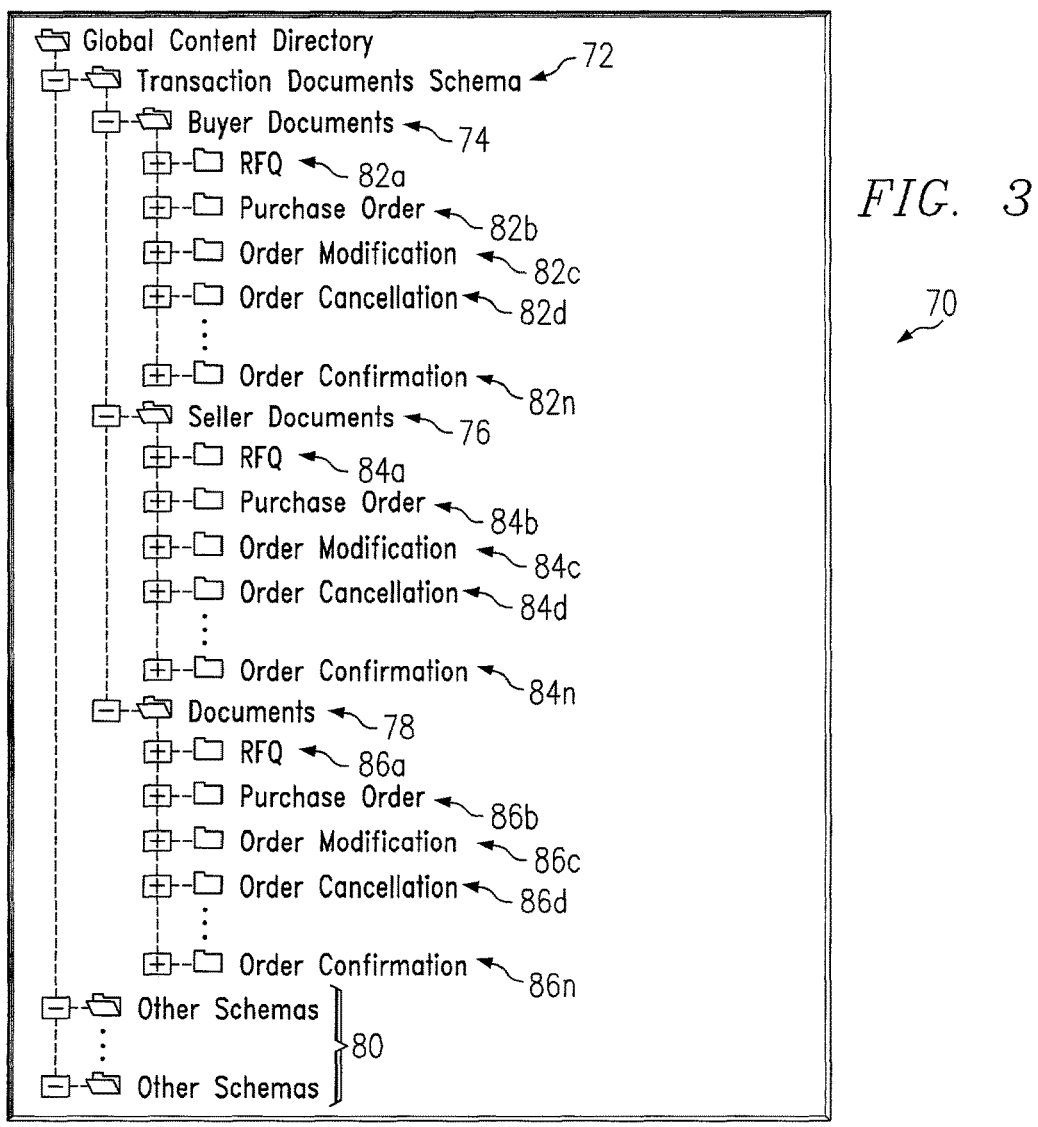
FIG. 3 illustrates an example directory structure of an example global content directory for document classes.

FIG. 3 illustrates an example directory structure 70 of an example GCD 42 for document classes. In addition to categorizing documents within product classes, documents categorized in GCD 42 may also be organized according to a schema that includes a set of document classes or taxonomy organized in a hierarchy, each document class being associated with a set of document features, characteristics, or other document attributes (a "document ontology"). Categorizing the documents within document classes as opposed to product class as described above in FIG. 2 allows buyer 20 to search for documents based upon document type independent of what product the document is related to.

In example directory structure 70, documents may be organized and cataloged according to transaction documents schemas 72 or other appropriate schemas, as described below. Within transaction documents schemas 72, there are three example classes: buyer documents class 74, seller document class 76, and documents class 78. Each of these classes 74, 76, and 78 includes several sub-classes (which may themselves include sub-classes). Therefore, the numerous classes of directory structure 70 form a "tree-like" hierarchical structure into which documents may be categorized, much like directory structure 44. For purpose of example, certain portions of directory structure 70 are "expanded" in FIG. 3 to show various levels of classes where "level" of class is the same as described above in FIG. 2. Although example directory structure 70 may use transaction documents schemas 72 as described above, any other appropriate schemas 80 may be used in addition to or instead of transaction documents schemas 72. The same document may be included in multiple schemas 80 and these alternative schemas 80 may be included in directory structure 70 and may be stored as a part of or separate from GCD 42. The organization of directory structure 70 is similar to the organization of directory structure 44 except that directory structure 70 pertains to document classes.

As shown in FIG. 3, buyer document class 74 includes documents organized from a buyer's viewpoint, seller document class 76 includes documents organized from a seller's viewpoint, and document class 78 includes all documents. Documents from a buyer's viewpoint in a transaction between buyer 20 and seller 30 contain favorable provisions for a buyer and typically are created by a buyer in a previous transaction. Documents from a seller's viewpoint in previous transactions between buyers 20 and sellers 30 contain provisions that are more favorable to the seller than the buyer and are generally created by a seller in the previous transaction. For example, the provisions that a document contains may vary based on the relative bargaining power of the buyer and the seller involved in the transaction. If the seller has greater bargaining power, then generally the document will reflect this by having provisions that are more favorable to the seller. But if the buyer has the greater bargaining power, then the resulting document typically has provisions that favor the buyer over the seller. Therefore, buyer 20 searching for a particular document may be interested in only locating documents that favor the buyer over the seller if buyer 20 has the greater bargaining power or may go with a seller's viewpoint document to shorten any negotiation with the seller since the document will already favor the seller.

Buyer 20 navigates directory structure 70 depending on what type of document buyer 20 is looking for. If buyer 20 is looking for purchase orders from a buyer's viewpoint, then buyer 20 would navigate to buyer document class 74 and buyer purchase order class 82b. Buyer 20 would then be able to perform a search of all the purchase orders that are from a buyer's viewpoint. Buyer 20 can further narrow the search in buyer purchase order class 82b by searching for purchase orders created less than one year ago and pertaining to cotton balls. Buyer 20 could also be interested in documents associated with order confirmations from a seller's viewpoint and therefore navigate through directory structure 70 to seller document class 76 and seller order confirmation class 84n to perform a search for all order confirmations from a seller's viewpoint. Buyer 20 may not care whether a document was created from the buyer's or seller's viewpoint and would instead prefer to search all available documents. If that is the case, then buyer 20 navigates through directory structure 70 to documents class 78 which contains all the documents. Buyer 20 may then search one of the document sub-classes 86a-86n depending on what type of document buyer 20 is looking for. Buyer 20 may also search document class 78 and search all the documents without further limiting the search.

Within directory structure 70 and the document classes, the documents may be categorized as standard documents and unique documents and stored in shared document repository 35 and seller databases 32 as described above in FIG. 2. The use of directory structure 70 as well as the pointers to shared document repository 35 and seller databases 32 are as described above in FIG. 2 in relation to directory structure 44 except the documents are classified in document classes instead of product classes. In directory structure 44, the documents are associated with particular products and the documents are searched through the product classes. In directory structure 70, the documents are not classified in product classes, but are categorized in document classes pertaining to the type of document. With directory structure 44, a buyer or seller is concerned with a particular product and wants to find documents associated with that product. With directory structure 70, a buyer or seller is interested in document type and wants to find all the documents of a specific type regardless of the products the documents are associated with.

FIG. 4 illustrates an example table 150 that may be included in a seller database 32 and/or repository 34. Database 32 and repository 34 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32 and/or repository 34. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa. Furthermore, documents may be stored as individual files and/or as data in tables, such as with product and seller data.

The data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD 42 or a buyer 20 requests indexed data from a database 32 and/or repository 34, the associated database management system (or other appropriate interface to database 32 and/or repository 34) does not have to search through every field 156 in the tables 150 included in database 32 and/or repository 34 to locate the requested data. Instead, the data may be indexed such that when a query is submitted for products having certain product attribute values and/or sellers 30 having certain seller attribute values that have been indexed, the database management system already knows the locations of such products in table 150 and may return data associated with these products without searching the entire table 150 or database 32 and/or repository 34 for the products. For example, if the ink color fields 156 and tip size fields 156 of columns 152d and 152e, respectively, are indexed, the index will typically identify the location of all products having black ink and a medium tip size.

If a query is submitted that also specifies a value of one or more non-indexed product attributes (for example, a query for pens manufactured by ABC Company, if the manufacturer fields 156 in column 152c are not indexed) and/or seller attributes, then the associated database management system may perform a search of database 32 and/or repository 34 for products that include the specified value of the one or more non-indexed attributes or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Figure 5:
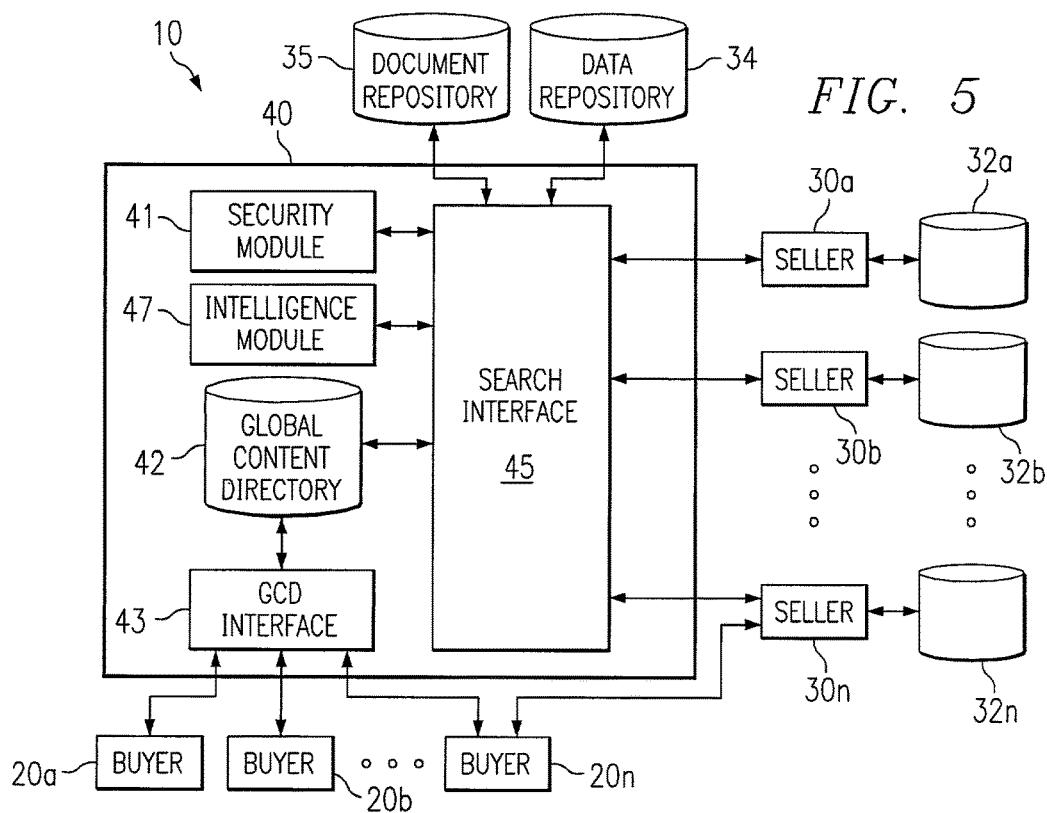
FIG. 5 illustrates an example electronic commerce system in further detail.

FIG. 5 illustrates an example e-commerce system 10 in further detail. As described above, numerous buyers 20 and sellers 30 may be coupled to GCD server 40 using network 12. Buyers 20 may access GCD server 40 using a web browser or in any other appropriate manner and GCD server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access GCD server 40 and use a GCD interface 43 to search or navigate GCD 42, seller databases 32, repository 34, and shared document repository 35. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example searching transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product and/or document buyer 20 desires, buyer 20 may then request a listing of products and/or documents in that class matching certain product attribute values. For example, if buyer 20 is browsing felt-tip pens class 60b, buyer 20 may request all products in class 60*b* (felt-tip pens) that have red ink and a fine tip and that are sold by a seller 30 located in the United States.

A search interface 45, or any other appropriate component of GCD server 40, may facilitate such a request by searching or requesting searches of repository 34 and/or seller databases 32 identified by one or more pointers associated with felt-tip pens class 60*b*, as described above. Search interface 45 may provide buyer 20 a search form in which to enter one or more search criteria. The types of search criteria that may be used may be identified in the search form or buyer 20 may be allowed to perform a general search of databases 32 and/or repository 34 for certain terms. For example, search interface 45 may provide buyer 20 with a search form tailored for class 60*b* that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want (and/or data in repository 34 associated with such sellers 30).

Based on search criteria provided by buyer 20 or automatically generated, search interface 45 may communicate a query to the appropriate seller database(s) 32 and/or repository 34 requesting that databases 32 and/or repository 34 each return a listing of all products (including associated product data and/or seller data) that meet the search criteria. Databases 32 and/or repository 34 may also return data relating to attribute values that were not included in the search criteria. For example, databases 32 may return a price and availability of products that meet the search criteria even if price and availability were not search criteria. The responses to the queries of databases 32 and/or repository 34 may be displayed to buyer 20 in any appropriate manner. For example, the products may be listed in order of relevance to the search criteria according to any suitable matching criteria. Furthermore, GCD 42 may reorder the product listing based on a request from buyer 20. For example, buyer 20 may request that the matching products be listed in order from least expensive to most expensive. Alternatively, the search results may be communicated directly to buyer 20 from databases 32 and/or repository 34.

Buyer 20 may select a product from the product listing to indicate a desire to initiate a transaction regarding the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20*n* and seller 30*n*) is shown to illustrate communication between buyers 20 and sellers 30, it should be understood that any buyer 20 may communicate with any seller 30 to conduct appropriate transactions.

Example e-commerce system 10 further includes security module 41 and intelligence module 47. Although security module 41 and intelligence module 47 are shown as being internal to GCD server 40, security module 41 and intelligence module 47 may be internal or external to GCD server 40. As described above, system 10 is operable to store and classify standard documents and unique documents. For instance, buyer 20*a* completes a transaction with seller 30*a* requiring the use of one or more documents. System 10 can take the documents used in the transaction and store the documents in either shared document repository 35 or seller databases 32 depending on whether the documents are standard documents or unique documents as defined above. Assume that the completed transaction between buyer 20*a* and seller 30*a* included the use of one standard document and one unique document. GCD server 40 analyzes the documents to determine if the documents are standard or unique documents. GCD server 40 stores the standard document in shared document repository 35 and stores the unique document in the seller database 32 associated with seller 30*a*.

The standard documents and unique documents may contain confidential or competitive information including, but not limited to, the names of the buyer 20 and seller 30 involved in the transaction, the product purchased, the quantity purchased, and the purchase price. Since the documents are stored in shared document repository 35 and seller databases 32 the documents will be accessible to other buyers 20 and sellers 30 through GCD 42, the confidential information of buyer 20 and seller 30 needs to be protected before the documents become freely available to the other buyers 20 and sellers 30. Therefore, security module 41 encrypts the standard documents and the unique documents (or portions of the documents, as described below) when the documents are stored in shared document repository 35 and seller database 32. The buyers 20 and sellers 30 with whom the documents are associated are each given the required permission level to decrypt the documents so that the associated buyer 20 and seller 30 can view the documents in their entirety with the confidential information. This allows a buyer 20 the ability to use GCD 42 to search and view all the documents where buyer 20 was a party, which therefore adds a document storage and review element to e-commerce transaction system 10. A buyer's or seller's own documents (when a buyer or seller is a party to a document) may be referred to as user documents. A buyer 20 or seller 30 typically has full access to their associated user documents. For example, buyer's 20a own documents are user documents for buyer 20a and buyer 20a has full access to all of the user documents of buyer 20a because buyer 20a is a party to all transactions from which the documents resulted. The user documents of buyer 20a are third party documents to all other buyers 20 because all the other buyers 20 were not a party to the transactions of buyer 20a. Therefore, each buyer 20 has their own user documents where they were a party to the transaction and that buyer 20 possesses the required permission level to access the user documents. But when a buyer 20 is not party to a transaction, any documents resulting from that transaction become third party documents to that buyer 20 and a buyer 20 does not have permission to access and view third party documents in their entirety.

Once the documents have been stored in shared document repository 35 and/or seller databases 32 and encrypted (wholly or partially), GCD server 40 or any other appropriate component categorizes the documents within GCD 42 for both document classes and product classes as described in FIGS. 2 and 3. The classification of the documents within document and product classes facilitates the retrieval of the documents at a later date by buyers 20 and sellers 30. GCD server 40 examines the documents to determine the document type and what products the document are related to. GCD server 40 associates pointers with the documents and GCD 42 so that GCD 42 can locate the documents in shared document repository 35 and seller databases 32 when buyer 20 performs a search for documents. For example, a buyer's purchase order for rollerball pens may be associated with rollerball documents class 63c within the rollerball pen class 60c of directory structure 44, buyer purchase order document class 82b of directory structure 70, and purchase order document class 86b of directory structure 70.

The ability of buyer 20 to view user documents increases the functionality of system 10 and adds a document storage and reuse element to system 10. But there needs to be a way for buyer 20 to store, access, and view user documents while concealing from other buyers 20 the confidential or competitive information contained in the user documents. When buyer 20 attempts to access and view user documents, security module 41 determines if buyer 20 has the required permission level to view the user documents. In one embodiment, when security module 41 encrypts the documents, security module 41 may password protect each document and require the correct password to decrypt the documents. When buyer 20 makes a request to access user documents, security module 41 prompts buyer 20 for the correct password for decryption. Because the documents are the user documents for buyer 20, buyer 20 will have the required permission level and the correct password. When buyer 20 enters the correct password, buyer 20 has full access to the user documents in their entirety. Once buyer 20 has full access, buyer 20 may examine the user documents for previous purchase summaries to help with future orders or reuse and modify the user document for current transactions.

If buyer 20 decides to reuse a user document for a current transaction, buyer 20 has several options. If buyer 20 was satisfied with the product and seller from a previous transaction buyer 20 may instruct intelligence module 47 to reissue the exact same order to the same seller using the document from the previous transaction. Intelligence module 47 may determine which sections in the user document are generic and which were specific to the previous transaction and may automatically update any sections of the documents that need updating (such as the date section). Once updated, the document is sent to the seller and the transaction is complete. If buyer 20 was not satisfied with the seller from the previous transaction, buyer 20 can use the user document from the previous transaction but instruct intelligence module 41 to change the seller information, update any generic sections that require updating, and reissue the user document to the new seller. Reissuing documents allows for buyer 20 to accelerate orders and therefore transactions because buyer 20 does not waste time re-inputting information into the documents.

Having a buyer 20 only able to access user documents limits the functionality and usefulness of system 10 and would prevent a buyer 20 new to system 10 from taking advantage of the document storage and reuse function because that buyer 20 would not have any user documents to reuse. Therefore, it is desirable to provide a way for buyers 20 and sellers 30 to access and use third party documents while still protecting the confidential information in the documents. Intelligence module 47 allows buyers 20 and sellers 30 to access and reuse third party documents while still protecting the confidential or competitive info in the third party documents. Intelligence module 47 takes the third party documents and segments the third party documents into one or more sections to create generic documents from the third party documents. The generic documents allow buyers 20 to have limited access to third party documents. In creating the generic documents, intelligence module 47 examines a third party document and removes or encrypts information from the sections containing the confidential information and the sections specific to a particular transactions.

For example, assume that buyer 20b wants to purchase blue ink ball point pens and performs a search using GCD 42 for documents related to blue ink ball point pens. The search may return several documents meeting the search criteria, one of which is a document for a transaction between buyer 20a and seller 30a. Buyer 20b will not be able to see that the document is between buyer 20a and seller 30a but instead will just see that the document is a third party document. Buyer 20b will not know the identity of buyer 20a and seller 30a. This is a third party document to buyer 20b because buyer 20b was not a party to the transaction. Buyer 20b would not know that the transaction was between buyer 20a and seller 20a but just that it is a third party document between two buyers and sellers where neither party is buyer 20b.

Intelligence module 47 may segment the third party document into sections such as header, footer, contact information for buyer, contact information for seller, date, quantity ordered, purchase price, subject, description, terms and conditions, and any other appropriate sections. Intelligence module 47 may determine which sections are generic and which sections are specific to the transaction between buyer 20a and seller 20a, buyer 20a and/or seller 30a may identify the generic sections, or the generic sections may be identified in any other appropriate manner. To create the generic document, intelligence module 47 removes from the third party document the information in the sections that is specific to the transaction between buyer 20a and seller 20a or that is confidential to either buyer 20a or seller 30a and leaves the information in the generic sections to the transaction. For example, in creating the generic document, intelligence module 47 may remove the name and contact information for buyer 20a and seller 20a, the quantity ordered, and the purchase price but still leave these sections in the generic document so buyer 20*b* can fill them in with their own information. Intelligence module 47 leaves in the generic document the sections and information for the headers, footers, description of the product, and the terms and conditions. As an alternative to removing confidential information, intelligence module 47 may encrypt such information. Intelligence module 47 may also dynamically update the date section in the generic document with the current date information. Intelligence module 47 may also automatically and dynamically update the generic document with other current information such as the buyer and seller name and contact information if buyer 20*b* is a registered user of system 10 and such information is readily available to intelligence module 47. To complete the generic document, buyer 20*b* or seller 30 may have to manually enter some of the information in the generic document such as the quantity desired and purchase price. Once the generic document is complete, buyer 20*b* can use the document to complete the transaction.

In subsequent transactions, a buyer 20 may wish to search for particular documents. Buyer 20 may access GCD interface 43 and perform a search of shared document repository 35 and/or one or more seller databases 32 using GCD 42. GCD interface 43 may allow buyer 20 to both navigate or "browse" the product classes and the document classes of GCD 42 and to search for a particular class or classes. For example, buyer 20 may either navigate product classes of GCD 42 to find documents related to a particular product or buyer 20 may search the document classes of GCD 42 for a particular document type. Any other suitable methods for identifying a document may also be used. When buyer 20 has located the appropriate class for the desired document, buyer 20 may then request a listing of documents in that class matching certain product and/or document attribute values. Buyer 20 will have full access to all user documents and limited access to third party documents (as generic documents). Buyer 20 may use search interface 45 to search for documents in the same manner as searching for products as described above.

A search interface 45, or any other appropriate component of GCD server 40, may facilitate such a request by searching or requesting searches of shared document repository 35 and/or seller databases 32 identified by one or more pointers associated with the documents, as described above. Search interface 45 may provide buyer 20 a search form in which to enter one or more search criteria for the desired documents. The types of search criteria that may be used may be identified in the search form or buyer 20 may be allowed to perform a general search of seller databases 32 and shared document repository 35 for certain terms. For example, search interface 45 may provide buyer 20 with a search form tailored for class 82*c* that includes fields where buyer 20 can specify desired document-related criteria. In lieu of a search form, search interface 45 may instead provide a single field where buyer can enter in desired search terms, such as "RFQ" and "ball point" (multiple search terms may be entered using Boolean operators or any other appropriate technique).

Based on search criteria provided by buyer 20 or automatically generated, search interface 45 may communicate a query to the appropriate seller database(s) 32 and/or shared document repository 35 requesting that databases 32 and shared document repository 35 each return a listing of all documents that meet the search criteria. The responses to the queries of databases 32 and shared document repository 35 may be displayed to buyer 20 in any appropriate manner. For example, the documents may be listed in order of relevance to the search criteria according to any suitable matching criteria. Furthermore, GCD 42 may reorder the document listing based on a request from buyer 20. For example, buyer 20 may request that the matching documents be listed with user documents listed first followed by third party documents or the standard documents first followed by the unique documents. Alternatively, the search results may be communicated directly to buyer 20 from seller databases 32 and shared document repository 35.

Buyer 20 may select and view a document from the document listing to indicate a desire to use the document in a transaction. If the document is a user document, buyer 20 will possess the required permission level to decrypt and view the document in its entirety and then modify it for use in the current transaction. If the document is a third document party, buyer 20 will view the generic document created from the third party document or view the unencrypted portions of the third party document with no access to the confidential information in the third party document. Buyer 20 may then complete or update the document and conclude the transaction.

Figure 6B:
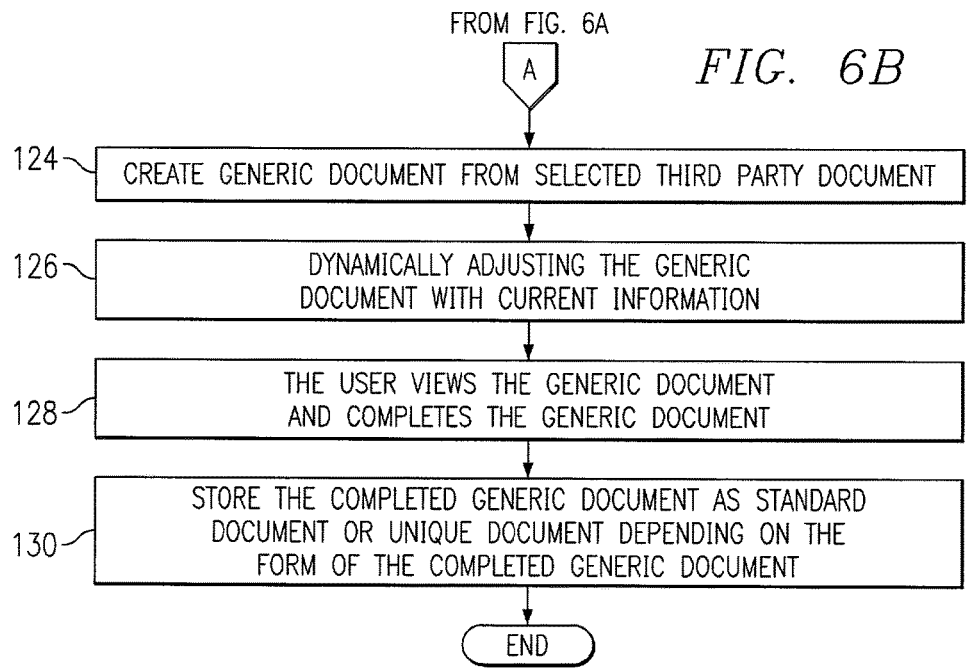

FIGS. 6A & 6B illustrate an example method for storing, classifying, and reusing documents using GCD 42. The method begins at step 102 when security module 41 encrypts the documents to control access to the documents, protect any confidential or competitive information contained in the documents and therefore not allow a buyer 20 who was not a party to the transaction from which the document originated to access or view the confidential information in the document. When the documents are encrypted, a permission level is assigned to each encrypted document so that if a buyer 20 has the required permission level, that buyer 20 can decrypt the document and view the document in its entirety. A buyer 20 will be given the required permission level for all the documents in which that buyer 20 was a party to the transaction involving the document. Therefore, a buyer 20 will have the requested permission level to access and view in their entirety all the user documents for that buyer 20. GCD server 40 stores the documents in one or more document repositories at step 104. For example, GCD server 40 may store the standard documents in shared document repository 35 and the unique documents in one or more seller databases 32. In addition, a buyer 20 or seller 30 may only use standard document, may only use unique documents, or the document may not be differentiated as such and only stored as documents.

At step 106, GCD server 40 associates and categorizes the documents into a plurality of product classes. Categorizing the documents into product classes allows buyer 20 to search for and locate documents associated with particular products or to locate documents for a specific product where buyer 20 is searching for a particular product. Buyer 20 can navigate through GCD 42 looking for a particular product and once the product is located, search for, locate, and view documents related to the product. For example, GCD server 40 may associate and categorize a purchase order document for felt-tip pens in felt-tip pen documents class 63*b* and pen documents class 59. Therefore, if buyer 20 is looking to purchase felt-tip pens, buyer 20 can readily find documents relating to felt-tip pens.

GCD server 40 associates and categorizes the documents with a plurality of document classes in step 108. Classifying the documents into document classes allows buyer 20 to search solely for documents independent of any relation to specific products. For instance, GCD server 40 may associate and categorize the purchase order for felt-tip pens created from the buyer's viewpoint in buyer purchase order document class 82*b* as well as purchase order document class 86*b*. This allows for buyer 20 to search for and locate documents based solely upon document type instead of locating a document based on what product the document is associated with. Categorizing the standard documents and the unique documents into product classes and document classes in steps 106 and 108 involves associating pointers with the classes within GCD 42 where the pointers identify documents stored in shared document repository 35 and seller databases 32 and where the pointers direct buyer 20 to the desired documents. In addition, depending on how the documents are to be stored and classified, only step 106 or only step 108 may be performed.

After the documents have been stored and categorized, the method continues at step 110, where buyer 20 accesses GCD 42 using GCD interface 43 to search for particular documents. As described above, buyers 20 may access GCD 42 using a web browser or in any other appropriate manner. Buyer 20 navigates or searches directory structures 44 or 70 at step 112 to a product or document class that is specific enough for buyer 20 (and/or a class that is at the end of a branch), as described above. At step 114, buyer 20 selects a desired class. When a class has been selected, buyer 20 is prompted at step 116 to enter search criteria for a desired product and/or a desired document. For example, as described above, GCD server 40 may provide buyer 20 a search form in which to enter one or more search criteria or a single field where buyer 20 may enter desired search criteria. Buyer 20 may enter a search for a particular product and still have the ability to retrieve documents related to that particular product. Therefore, buyer 20 does not have to specifically search for documents. For instance, if buyer 20 is interested in pens, buyer 20 can search the product classes for pens and GCD server 40 or any other appropriate component may also retrieve documents relating to pens from the document classes for pens. The related documents may be presented to buyer 20 after buyer 20 has selected and searched for a particular product.

Using the search criteria provided by buyer 20 or otherwise generated, search interface 45 searches, at step 118, for documents matching the search criteria in shared document repository 35 and/or one or more seller databases 32 identified by pointers in the class selected by buyer 20. Search interface 45 may perform the search in any appropriate manner. For example, based on a pointer associated with a class, GCD server 40 first may search shared document repository 35 or a portion of shared document repository 35 (that is identified by the pointer) for standard documents matching the search criteria and then may search one or more seller databases 32 (identified by the same pointer or an associated pointer) for unique documents. For instance, the standard document in shared document repository 35 may have an associated pointer to each seller database 32 providing unique documents to further explain or expand upon the standard document. Alternatively, this searching may be performed in the opposite order or using any other appropriate techniques. A listing of the resulting standard and/or unique documents obtained from shared document repository 35 and/or seller databases 32 may be combined and presented to a buyer 20 as a unified set of search results. At step 120, GCD server 40 presents to buyer 20 the search results containing the listing of one or more documents matching (or partially matching) the search criteria.

After GCD server 40 presents the documents matching the search, at step 122 buyer 20 examines the results and selects a document from the search results. If buyer 20 selects a third party document, buyer 20 does not have the required permission level to decrypt the third party document. Therefore to protect the confidential information in the third party document, intelligence module 47 creates a generic document from the third party document at step 124, so that buyer 20 may view and modify the generic document version of the selected third party document. Creating the generic document includes first segmenting the third party document into sections. Once segmented into sections, intelligence module 47 examines the sections of the third party document to determine which sections are generic and which sections are specific to a particular previous transaction and which sections contain confidential information. Generic sections may include, but are not limited to, headers, footers, dates, product type, and product description. These sections are considered generic because they will generally need to be in all documents of this type and also do not contain any confidential or competitive information related to the buyer and seller who were the original parties to the document. Sections which are considered specific to a particular transaction and/or are confidential include, but are not limited to, buyer name, seller name, quantity of product purchased, and the purchase price of the product. These sections are considered specific to a particular transaction and/or confidential because a buyer may not want other buyers 20 to know which sellers 30 they buy from, what products they buy, how much they buy, and how much they pay for the products.

Intelligence module 47 may remove the information from the sections that are specific to a particular transaction and carry forward the information in the generic sections. Intelligence module 47 may carry forward the sections specific to a particular transaction but leave the sections blank so buyer 20 can fill them in with the information for buyer 20. At step 126, intelligence module 47 dynamically adjusts the generic sections with current information such as the date and the name and contact information for buyer 20. Dynamically adjusting the generic documents eliminates the need for buyer 20 to enter in the current date and the name and contact information for buyer 20. Therefore, buyer 20 may complete the transaction more quickly with less effort by completing the generic document. Alternatively, buyer 20 may receive the third party document with all the confidential information removed but not updated and therefore buyer 20 may update and complete the document. Once the generic document is dynamically updated and all confidential information has been removed, buyer 20 views the generic document at step 128 and completes the generic document by adding such information as quantity desired and purchase price. When the generic document is complete, buyer 20 may use the document in a transaction. GCD server 40 saves the document as either a standard document or a unique document at step 130 so other buyers 20 may use it in the future and the modified generic document becomes a user document for the buyer.

If buyer 20 selects a user document at step 122, buyer 20 should possess the required permission level to decrypt the user document because a user document by definition is buyer's 20 own document and therefore buyer 20 has the required permission level. At step 132, security module 41 acquires the required decryption password or other information from buyer 20 and decrypts the document. At step 134 buyer 20 decides if buyer 20 wants to reissue the user document for a current transaction or simply view the user document. If buyer 20 decides to view the user document, then at step 136 buyer 20 views the user document from a previous transaction. Buyer 20 will typically view a user document to gather information about previous transactions, to study order history, determine when to initiate the next transaction, or for any other appropriate reason for viewing the user document. By viewing the user document, buyer 20 may see when the previous orders were placed, what where the terms and conditions associated with the previous orders, and when is the ideal time to initiate the next transaction.

If at step 134 buyer 20 decides to reissue the user document for a new transaction, then at step 138 intelligence module 47 may reissue the user document updated with current information, such as the current date. When reissuing the user document, intelligence module 47 may determine which sections of the document are generic and which were specific to the previous transaction. Intelligence module 47 may also update the reissued user document with new seller 30 information if buyer 20 decides to use a different seller in this transaction. At step 140, buyer 20 views the reissued user document and completes any sections not updated by intelligence module 47 and changes any sections buyer 20 decides require changing. GCD server 40 saves the reissued user document as a standard or unique document depending on if the reissued user document is in a standard format in step 142 and the method ends.

The method discussed in FIGS. 6A & 6B is merely one example method for the storing, classifying, and reusing of documents by buyers 20 and/or sellers 30. The steps may be performed in a different order than presented above and certain steps may not be performed.

Although the present invention has been described with several embodiments, various changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. An electronic commerce system, comprising:
   one or more buyer entities and one or more seller entities;
   one or more document repositories each including one or more documents used during a first electronic commerce transaction;
   one or more computers coupled with the one or more document repositories and comprising one or more processors, the one or more computers comprising:
   a global content directory including two or more classes organized in a hierarchy having an inverted tree structure, each class categorizing, using the one or more processors, the one or more documents and associated with one or more attributes of the one or more documents categorized in the class, at least one of the classes having one or more pointers that identify one or more of the one or more document repositories;
   a search interface associated with the global content directory, the search interface communicates, using the one or more processors, a search query to the one or more document repositories identified by one of the one or more pointers to search the one or more documents stored in the one or more document repositories;
   a security module associated with the global content directory, the security module decrypts, using the one or more processors, the one or more documents allowing a user computer to access the one or more documents;
   an intelligence module associated with the global content directory, the intelligence module updates, using the one or more processors, one or more sections in the one or more documents with current information based on a second electronic commerce transaction and creates, using the one or more processors, one or more blank standard documents from the one or more documents, the blank standard documents allowing the user computer to enter data into the sections of the blank standard document the first time the user computer accesses the blank standard document; and
   at least one of the one or more buyer entities initiates the second electronic commerce transaction with at least one of the one or more seller entities based, at least in part, on the updated one or more documents.

2. The system of claim 1, wherein the one or more documents are stored in a shared document repository.

3. The system of claim 1, wherein the one or more documents comprise unique documents stored in one or more seller databases.

4. The system of claim 1, wherein the classes comprise two or more document classes.

5. The system of claim 1, wherein the classes comprise two or more product classes.

6. The system of claim 1, wherein the security module decrypts the one or more documents when the user computer requesting the one or more documents has a required permission level.

7. The system of claim 1, wherein the intelligence module updates the sections in the one or more documents when the user computer requests the one or more documents to be updated.

8. The system of claim 1, wherein the search interface allows the user computer to access documents after the security module decrypts the one or more documents but before the intelligence module updates the one or more documents with the current information associated with an associated transaction.

9. The system of claim 1, wherein the intelligence module:
   removes information from the sections of the one or more documents; and
   arranges the sections in a particular order as a new document to create the blank standard documents.

10. A computer-implemented method, comprising:
    storing, by a processor, one or more documents, used in a first electronic commerce transaction, in one or more document repositories;
    associating, by the processor, the one or more documents with a global content directory, the global content directory including two or more classes organized in a hierarchy having an inverted tree structure, each class categorizing the one or more documents and associated with one or more of the one or more documents categorized in the class;
    searching, by the processor, for particular documents by navigating through one or more of the classes;
    automatically decrypting, by the processor, the one or more documents allowing a user computer to access the one or more documents;
    automatically reissuing, by the processor, the one or more documents updated based on current information of a second electronic commerce transaction;
    electronically creating, by the processor, one or more blank documents, the one or more blank documents allowing a user computer to enter data into the one or more blank documents the first time the user computer accesses the one or more blank documents; and
    causing one or more seller entities to initiate the second electronic commerce transaction based, at least in part, on the updated one or more documents.

11. The computer-implemented method of claim 10, wherein the classes comprise two or more document classes.

12. The computer-implemented method of claim 10, wherein the classes comprise two or more product classes.

13. The computer-implemented method of claim 10, wherein reissuing the one or more documents comprises automatically changing one or more sections in the one or more documents based on the current information of the second electronic commerce transaction.

14. The computer-implemented method of claim 10, wherein reissuing the one or more documents comprises determining which sections of the one or more documents are generic and which sections are specific to a particular transaction.

15. The computer-implemented method of claim 14, wherein reissuing the one or more documents comprises dynamically adjusting the generic sections of the one or more documents.

16. The computer-implemented method of claim 14, wherein reissuing the one or more documents comprises determining which sections carry forward into one or more reissued documents.

17. The computer-implemented method of claim 10, wherein decrypting the one or more documents comprises determining that the user computer has a permission level required for decryption.

18. The computer-implemented method of claim 10, further comprising accessing the generic sections and the transaction specific sections of the one or more documents after the decryption of the one or more documents.

19. The computer-implemented method of claim 10, wherein searching for particular documents comprises navigating through the document classes searching for a particular type of document.

20. The computer-implemented method of claim 10, wherein searching for particular documents comprises navigating through the product classes searching for documents associated with a particular product.

21. A non-transitory computer-readable medium embodied with software, the software when executed using one or more computers comprising one or more processors:
    stores one or more documents, used in a first electronic commerce transaction, in one or more document repositories;
    associates the one or more documents with a global content directory, the global content directory including two or more classes organized in a hierarchy having an inverted tree structure, each class categorizing the one or more documents and associated with one or more of the one or more documents categorized in the class;
    searches for particular documents by navigating through one or more of the classes;
    automatically decrypts the one or more documents allowing a user computer to access the one or more documents;
    automatically reissues the one or more documents updated based on current information of a second electronic commerce transaction;
    electronically creates one or more blank documents, the one or more blank documents allowing a user computer to enter data into the one or more blank documents the first time the user computer accesses the one or more blank documents; and
    cause one or more seller entities to initiate the second electronic commerce transaction based, at least in part, on the updated one or more documents.

22. The non-transitory computer-readable medium of claim 21, wherein the classes comprise two or more document classes.

23. The non-transitory computer-readable medium of claim 21, wherein the classes comprise two or more product classes.

24. The non-transitory computer-readable medium of claim 21, wherein reissuing the one or more documents comprises automatically changing one or more sections in the one or more documents based on the current information of the second electronic commerce transaction.

25. The non-transitory computer-readable medium of claim 21, wherein reissuing the one or more documents comprises determining which sections of the one or more documents are generic and which sections are specific to a particular transaction.

26. The non-transitory computer-readable medium of claim 25, wherein reissuing the one or more documents comprises dynamically adjusting the generic sections of the one or more documents.

27. The non-transitory computer-readable medium of claim 25, wherein reissuing the one or more documents comprises determining which sections carry forward into one or more reissued document.

28. The non-transitory computer-readable medium of claim 21, wherein decrypting the one or more documents comprises determining that the user computer has a permission level required for decryption.

29. The non-transitory computer-readable medium of claim 21, wherein the software when executed using one or more computers further accesses the generic sections and the transaction specific sections of the one or more documents after the decryption of the one or more documents.

30. The non-transitory computer-readable medium of claim 21, wherein searching for particular documents comprises navigating through the document classes searching for a particular type of document.

31. The non-transitory computer-readable medium of claim 21, wherein searching for particular documents comprises navigating through the product classes searching for documents associated with a particular product.

* * * * *